United States Patent
Wolkovitch

[11] 3,942,747
[45] Mar. 9, 1976

[54] JOINED WING AIRCRAFT
[76] Inventor: Julian Wolkovitch, 28603 Trailriders Drive, Rancho Palos Verdes, Calif. 90274
[22] Filed: June 24, 1974
[21] Appl. No.: 482,226

Related U.S. Application Data
[63] Continuation of Ser. No. 318,720, Dec. 27, 1972, abandoned.

[52] U.S. Cl. .................. 244/13; 244/16; 244/45 R; 244/87
[51] Int. Cl.² ................................... B64C 3/00
[58] Field of Search ...... 244/13, 16, 35 R, 36, 45 R, 244/119, 123, 153 R, 154, DIG. 1, 87, 108, 38; 46/79, 80

[56] References Cited
UNITED STATES PATENTS

| | | | |
|---|---|---|---|
| 1,023,556 | 4/1912 | Edwards | 244/45 R |
| 1,104,045 | 7/1914 | Henson | 244/13 |
| 1,269,645 | 6/1918 | Robbins | 244/45 R |
| 1,478,211 | 12/1923 | Farmer | 244/13 |
| 1,613,842 | 1/1927 | Mummert | 244/108 |
| 2,288,829 | 7/1942 | Newman | 244/13 |
| 2,461,805 | 2/1949 | Barker | 244/45 R |
| 2,643,833 | 6/1953 | Ambroise | 244/87 X |
| 3,185,412 | 5/1965 | Rogallo | 244/DIG. 1 X |
| 3,584,813 | 6/1971 | Sweeney et al. | 244/123 X |
| 3,614,032 | 10/1971 | Purcell | 244/36 |
| 3,679,157 | 7/1972 | Roberts et al. | 244/154 X |

FOREIGN PATENTS OR APPLICATIONS
441,510   8/1912   France .................... 244/45 R Primary Examiner—Trygve M. Blix
Assistant Examiner—Barry L. Kelmachter
Attorney, Agent, or Firm—Romney Schaap Golant Scillieri & Ashen

[57] ABSTRACT

An aircraft of the Canard type in which a first airfoil is attached to an aft fin portion of the fuselage at a higher elevation than a second airfoil which is attached to the fore portion of the fuselage. The second airfoil extends outwardly and rearwardly to meet the first airfoil whereby a triangular configuration is formed in plan view and in front elevation view. The airfoils may be flexible; simple cable controls may be provided to control the aircraft so that even inexperienced pilots can easily operate the aircraft. The triangular configuration ensures a lightweight and inexpensive yet rugged and strong aircraft. The aircraft may also include a split rudder and may be hinged for folding to facilitate storage and transportation.

21 Claims, 9 Drawing Figures

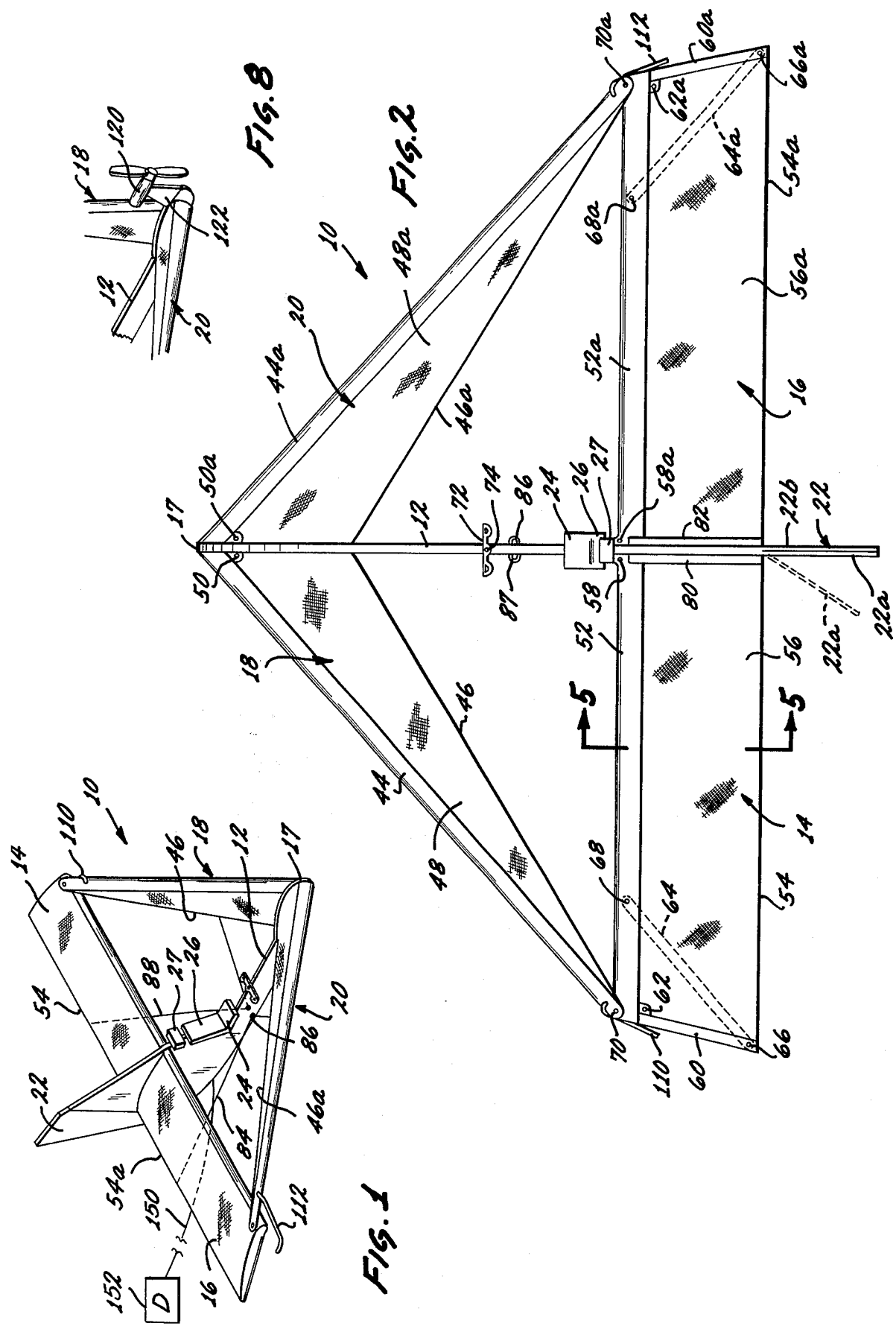

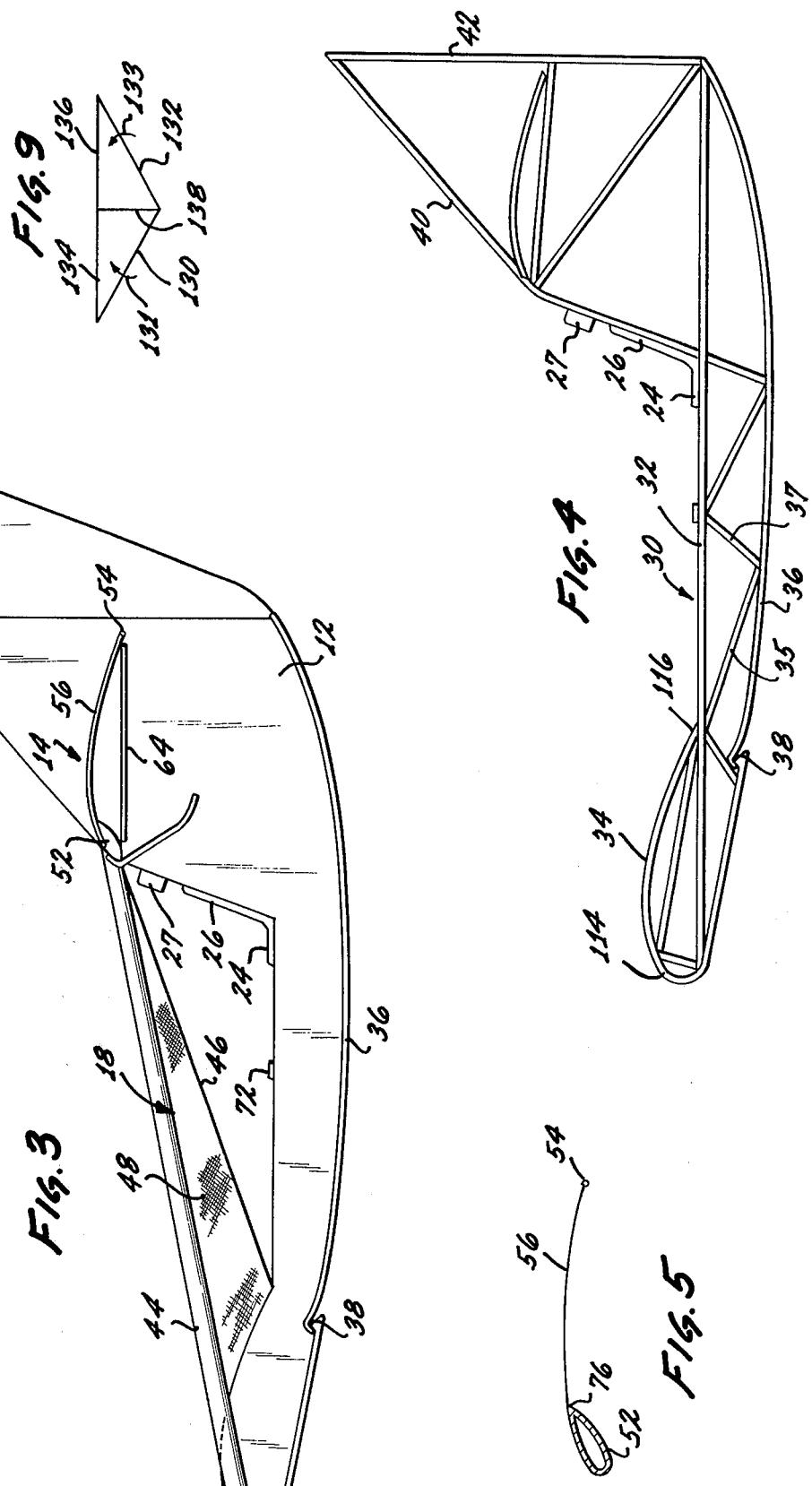
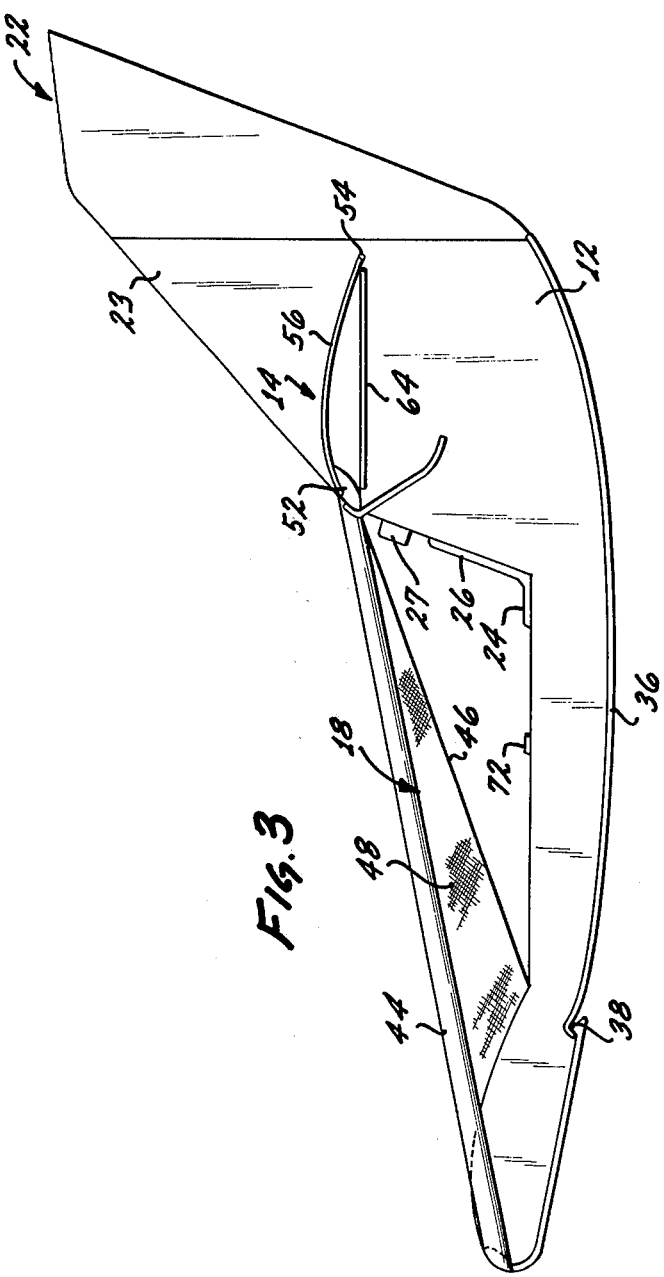

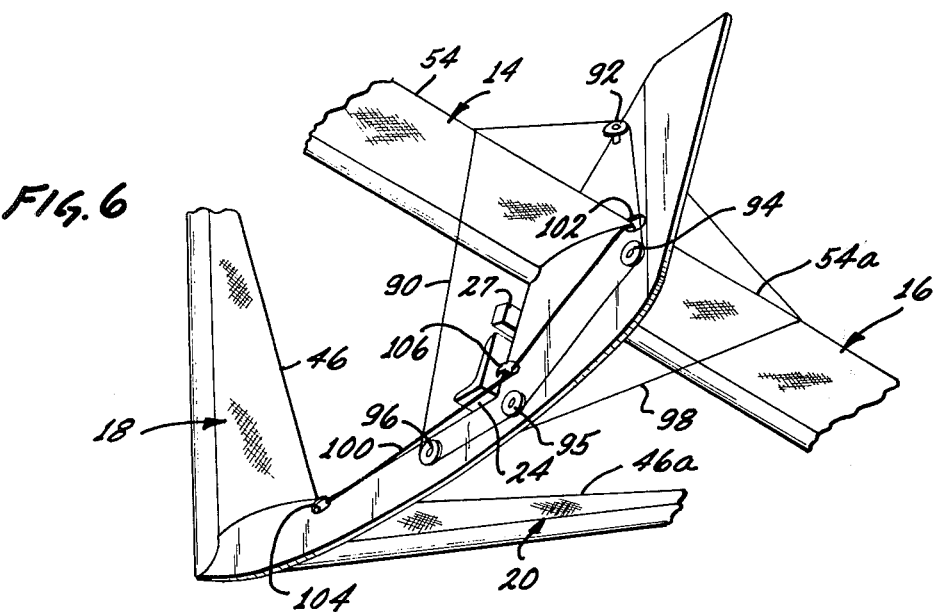
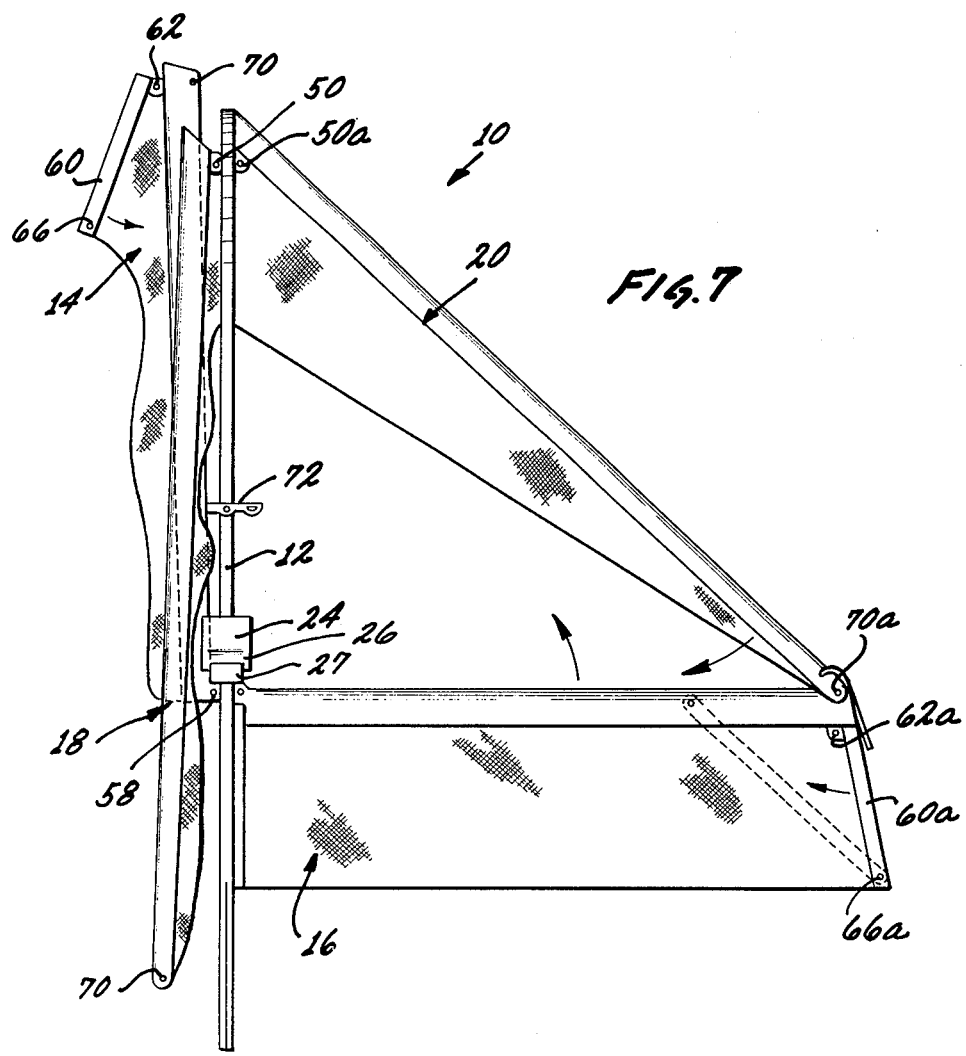

JOINED WING AIRCRAFT

REFERENCE TO RELATED APPLICATION

This is a continuation of Application Ser. No. 318,720, filed Dec. 27, 1972 and now abandoned.

BACKGROUND OF THE INVENTION

1. Field of the Invention

The present invention relates to a simply constructed and inexpensive aircraft and more particularly to a simply constructed and inexpensive aircraft which maybe of the flexible wing type.

2. Description of the Prior Art

Flexible wing aircraft have been known for many years as exemplified in 1910 by the Edwards rhomboidal airplane and the Picat Dubreuil airplane, and in the 1920's by the Platz sailwing glider. It is to be understood that the term "flexible wing" refers to a wing having a flexible lifting portion made of material such as canvas, for example; the flexible lifting portion forms, when properly inclined to the relative wind, an airfoil curve in response to the pressure differential on its upper and lower surfaces. This wing is to be distinguished from the more usual rigid type wing formed by a frame covered with sheet metal in which the airfoil curve is maintained by the stiffness of the wing structure, even at zero relative wind. The early aircraft mentioned are of interest for their simplicity; however, these aircraft were not entirely aerodynamically sound or were difficult to fly.

Later inventors developed the modern version of the flexible wing aircraft where the wing might include a leading edge spar, a trailing edge cable and a tip brace. This is exemplified by U.S. Pat. No. 2,228,829 to E. P. S. Newman. Additional work has been done by F. M. Rogallo who has received a number of United States patents extending over two decades for various aircraft systems using flexible lifting surfaces.

In the 1960's and 1970's interest in flexible wing aircraft has continued, such as exemplified by U.S. Pat. No. 3,584,813 to T. E. Sweeney et al. Since about 1948, Sweeney and his associates at the Princeton University Department of Aeronautical Engineering have been developing flexible wing aircraft of the type having a leading edge spar, a trailing edge cable, and a bridle system for bracing the flexible wing. Another example of interest is U.S. Pat. No. 3,614,032 to T. H. Purcell which also illustrates a leading edge spar and a trailing edge cable between which is a flexible material having embedded stays or cables for stiffening purposes.

Nevertheless, in spite of the work that has been done, there remain control problems, e.g. flexible wing aircraft have been found to be prone to luffing at low lift coefficients. Luffing is a nautical term which denotes fluttering of a sail. Manufacturing and cost problems have also arisen since flexible wings appeared to require somewhat massive and heavy structures in order to withstand the tension of the trailing edge cable. It has been found that this tension must be relatively high to prevent excessive luffing and billowing of the sail. Excessive billowing is undesirable because it causes loss of lift and increased induced drag. Further, no one appears to have developed an aircraft which can be flown and easily controlled by an individual having little or no flying experience. Nor does it appear that anyone has developed an aircraft capable of sustained flight, yet limited performance for use as an amusement type device. The term "limited performance" as used herein is intended to mean an aircraft limited in such characteristics as altitude so that even a novice pilot would have difficulty hurting himself or the aircraft regardless of the pilot's handling of the aircraft. Thus the prior art has not indicated a truly simple yet easily flyable aircraft which is exceedingly safe to operate by one who has never flown before. The majority of the prior art patents relate to traditional type aircraft in which the wings are made of flexible material, or to aerospace systems in which weight and volume are critical factors so that foldable, flexible wings are suggested.

SUMMARY OF THE INVENTION

The present invention solves some of the problems in the prior art by providing an aircraft comprising fuselage having fore and aft portions; a first airfoil connected to the aft portion of the fuselage, and the airfoil extending outwardly therefrom; a second airfoil connected to the fuselage at a location spaced forwardly from the first airfoil and at an elevation different from the first airfoil, the second airfoil extending rearwardly away from the fuselage, and having extended ends connected to the first airfoil, the first and second airfoils forming a triangular configuration in front elevation view wherein the first airfoil resists lifting loads developed on the second airfoil. The airfoils may also form triangular configurations in plan view and also in side view when in combination with the upper part of the fuselage profile. Further, the aircraft may have flexible airfoils in which case the leading edge includes a spar and the trailing edge is flexible and may be defined by a cable. Control cables can also be provided having two ends, one end connected to the trailing edge of one of the airfoils and the other end connected to the trailing edge of the other airfoil whereby increasing the tension in a cable lessens the lift of the airfoil affected. The control cable extends to the fuselage adjacent a location where the operator would be positioned. The aircraft may also have a split rudder and incorporate hinges to allow folding for storage and transportation. The aircraft structure may also include a continuous cable extending from one wing along the fuselage to the other wing.

It is a general aim of the present invention to provide a simply constructed yet strong and rugged aircraft of the flexible wing type which is so designed to amply protect the pilot even in an emergency landing situation. Another aspect of the present invention is to provide an aircraft of the flexible wing type having good stability and control including gentle stall characteristics, and further to provide an aircraft having an easily operable control system.

Another aim of the present invention is to provide an aircraft of the flexible wing type which is easily foldable to form a compact package for facilitating transportation and storage, and to provide an aircraft having flexible wings which is uncomplicated, lightweight and easy to handle on the ground in an unfolded condition, even in relatively strong winds.

Still another object of the present invention is to provide an aircraft of the flexible wing type which is inexpensive to manufacture and which may be designed either in a glider configuration or in a powered configuration. A more general object of the present invention is to provide an aircraft of the Canard type which is strong and rugged and yet light in weight.

Other objects and advantages of the invention will appear from the following description and taken in conjunction with the accompanying drawings.

BRIEF DESCRIPTION OF THE DRAWINGS

FIG. 1 is a perspective view of the aircraft of the present invention as viewed from a position above the aircraft.

FIG. 2 is a plan view of the aircraft shown in FIG. 1.

FIG. 3 is an elevational view of the aircraft shown in FIG. 1.

FIG. 4 is an elevational view of the frame of the fuselage of the FIG. 1 aircraft.

FIG. 5 is a sectional elevational view of a wing taken along line 5—5 of FIG. 2.

FIG. 6 is a perspective view, from a position beneath a modified FIG. 1 aircraft.

FIG. 7 is a plan view of the FIG. 1 aircraft showing the left side of the aircraft in a folded position for transporting and storage.

FIG. 8 is a partial perspective view of the front portion of a modified aircraft showing the mounting of an engine.

FIG. 9 is a diagrammatic front elevation view of the FIG. 1 aircraft illustrating the lifting forces acting on the tails of the aircraft.

DESCRIPTION OF THE PREFERRED EMBODIMENTS

While the present invention is susceptible of various modifications and alternative constructions, illustrative embodiments are shown in the drawings and will herein be described in detail. It should be understood however that it is not the intention to limit the invention to the particular forms disclosed; but on the contrary the invention is to cover all modifications, equivalences and alternative constructions falling within the spirit and scope of the invention as expressed in the claims.

Referring now to FIG. 1, there is illustrated an aircraft 10 which includes a fuselage 12, a port wing or airfoil 14 and a starboard wing or airfoil 16. Extending from the nose 17 in the fore-portion of the fuselage and tapering rearwardly to connect to the wings are a port tail 18 and a starboard tail 20. Such a design is commonly referred to as a canard or tail first type. Attached to the rear or aft portion of the fuselage is a rudder 22, while attached between the nose and the rudder is a pilot's seat 24, a backrest 26 and a headrest 27. It can be seen that the aircraft is in the form of a glider though it is to be understood that with slignt modification as will be explained hereinbelow in reference to FIG. 8 the aircraft can be powered.

The aircraft of FIG. 1 is purposefully designed to be easily operated so that individuals with limited or even no flight training can still operate the aircraft with relative ease. In particular, it is contemplated that the aircraft will be used with a control device that limits the distance from the ground the aircraft can fly and thus enhance safety; should the aircraft be operated incorrectly causing it to return to the ground the maximum vertical distance of drop is limited to a predetermined value. It is further contemplated that the aircraft with such an altitude control device can be used as an amusement park device or sport apparatus. For example, a system could be built using a number of aircraft for descending a hill along a path similar to that a skier might take. Since the aircraft is easy to operate and relatively inexpensive to manufacture, for a nominal cost individuals with very limited or even no prior training can achieve, to a certain extent, the thrill of flight in a craft that they themselves operate. And this can be done in relative safety.

A major advantage of the present invention is that the aircraft is simply constructed yet strong and rugged. Referring now to FIGS. 2, 3 and 4, there is illustrated in much greater detail the construction of the aircraft 10. The fuselage 12 is relatively narrow (see FIG. 2) and comprises a simple framework of metal tubes 30 as shown in FIG. 4. These tubes can be welded or connected in any suitable fashion to one another to form a strong and yet extremely lightweight unit. It is of course to be understood that other material such as synthetic resin or even wood can be used to form the frame. Or, the fuselage may be formed of a single piece or block of polystyrene foam covered with reinforced glass fibers, for example. The frame includes a main straight member 32 upon which the seat 24 is mounted and upon which a curved nose member 34 is attached. Beneath the main member is a skid member 36 which defines the bottom of the aircraft and upon which the aircraft may land. The skid member 36 is bent at one end to mate with one end of the curved member 34 to form a hook 38. The hook allows the aircraft to be towed or catapulted should it be desired. Extending upwardly from the main member 32 is a fin member 40 to which the backrest 26 and headrest 27 are attached and to which a rudder mount member 42 is attached. Additional strut members, such as struts 35 and 37, are provided to connect the longer first mentioned members and provide strength and rigidity to the frame at a minimum of weight. The frame may be covered, if desired, by a cnvenient material such as canvas or mylar to enhance its strength and appearance as well as its simplicity and low cost.

Pivotally connected to the nose portion 17 are the port and starboard tails 18, 20. The tails are preferably constructed of leading streamline (in cross section) spars 44, 44a. The spars establish or define the leading edges of the tails. Defining the trailing edges of the tails are cables 46, 46a. Covering the spars, connected to the cables and forming the airfoil upon which the lifting forces act are sheets 48, 48a of flexible material such as canvas or a suitable synthetic resin. This structure is similar to that used on a simple boat sail so that the construction is commonly referred to as a sail wing. As is noted, the tails are designed in plan view to be tapered as one moves away from the fuselage toward the trails' extended ends and in elevation view to form a dihedral angle. The port tail 18 is connected to the fuselage by a hinge 50 so as to be pivotable relative to the fuselage; in a similar fashion the starboard tail 20 is pivotally connected to the fuselage by the hinge 50a.

Referring again to FIG. 2, the port and starboard wings 14, 16 are constructed in a fashion analogous to that of the tails. The wings have leading streamline (in cross section) spars 52, 52a defining the leading edges and cables 54, 54a which define the trailing edges. Between the spars and the cables are sheets 56, 56a of flexible material upon which the lifting forces act when there is relative motion with the air. Each of the spars 52, 52a is pivotally connected to the fuselage by a hinge such as the hinge 58 for the spar 52 and the hinge 58a for the spar 52a.

At the extended ends of the wings are tip ribs 60, 60a, the tip rib 60 being pivotally connected to the spar 52 by a hinge 62 while the tip rib 60a is connected to the spar 52a by a hinge 62a. Also connecting the tip rib 60 to the spar 52 is a tip brace 64. The tip brace is fastened to one end of the tip rib by fastener 66 while the other end of the tip brace is pivotally connected to the spar 52 by the hinge 68. In a similar manner, the tip brace 64a is pivotally connected to the spar 52a by a hinge 68a while the other end of the tip brace is attached by a fastener 66a to an end of the tip rib 60a. The tension in the trailing edge cables 54 and 54a may be adjusted by means of turnbuckles (not shown) preferably positioned at the extreme ends of the cables 54 and 54a near their point of attachment to the tip ribs 60 and 60a. Additional means of adjusting the tension in the cables are described hereinbelow in the discussion on FIG. 7.

Attached to the upper part of the fuselage are two ribs 80 and 82, FIG. 2, which extend outwardly from the fin 23 and which have undersurfaces that are cambered to conform to the desired shape of the flexible material of the wings. In flight when the wings are subjected to lifting forces the flexible material will billow upwardly thereby pressing the flexible material to the ribs 80 and 82. This feature minimizes the leakage of air from the bottom surface of the wing to the upper surface; such a leakage causes a loss of lift and increases induced drag. It has been found unnecessary to bond the flexible material to the ribs since air pressure is suficient to cause a close contact. By not bonding the wing may also be folded without hindrance. However, if the aircraft is nonfoldable any suitable means may be used to bond or attach the flexible material to the ribs if so desired. It is now readily apparent that while the wing has sufficient strength and capacity to provide lift it is also constructed in a manner to be easily folded for transportation and storage purposes.

The tip ribs 60 and 60a while shown to be linear may be curved so that the wings of the aircraft have a semi-elliptical appearance in plan view thereby enhancing the aesthetic appearance of the aircraft.

A fastener 70 having a portion attached at the end of the spar 52 and a portion attached to the spar 44 allows the port tail and port wing to be fastened together. A similar fastener 70a allows the spar 44a and the spar 52a to be fastened together.

The tail spars 44 and 44a form a dihedral angle and are swept backwardly; it is to be understood that there is no required angle of the dihedral or the sweep. All that is preferred is that the spars 44 and 44a are attachable to the spars 52 and 52a, respectively. When connected, a triangular structure is formed as viewed in plan (see FIG. 2). This connection provides a certain rigidity to the aircraft even though major portions of the tails and wings are comprised of flexible or non-rigid material. The rigidity and strength achieved is at low cost and without the addition of further structural members which might add weight. For example, the triangular structure provides lateral stiffening for the fuselage. The fuselage may therefore be very narrow. Once again this reduces the size, weight and cost of the aircraft.

A particular advantage of the rigidity provided by the triangular structure is that it enables the wing and tail spars 44, 44a, 52, 52a, to resist the loads applied by the taut trailing edge cable, without the spars being excessively massive or heavy.

Because the tail spars have their ends, those closest to the fuselage, lower than the fuselage ends of the wing spars a triangular truss structure also is evident when the airplane is viewed in front elevation. Since the wing spars can withstand compressive loads they support the tail spars against the loads induced in the tail spars by aerodynamic lift on the tails 18 and 20. This enables the tail spars to be of smaller cross section and consequently lighter and less costly than would be the case if the wing spars were unable to carry compressive loads. Referring to FIG. 9, a diagrammatic drawing of the aircraft as viewed from the front is illustrated. Lines 130 and 132 represent the tails 18 and 20, lines 134 and 136 represent wings 14 and 16 and line 138 represents the fuselage 12. Also shown, by the arrows 131, 133, are the loads or forces to which the tails are subjected. These loads are resisted by the wings because of the triangular disposition. This structure, therefore, represents a distinct advantage. This structure also allows the fuselage 12 to be very narrow and of uniform thickness along its entire length.

It is to be further understood that while the particular design of the aircraft shown in FIGS. 2 and 3 indicates a sweptback tail and an unswept wing, variations from this design are contemplated and come within the scope of the appended claims. For example, the wings may also be swept back or even swept forward, up to about 30° if desired, while the angle formed between the spars 44, 44a of the tails may be varied accordingly to the dimensions of a particular design. Further the tip ribs 60, 60a shown to be at an obtuse angle relative to the wing spars 52, 52a respectively may be designed to meet at an acute angle or at a right angle or even have a curved design as already mentioned.

The split rudder 22, shown more clearly in FIG. 2, is divided into two halves 22a and 22b. Each rudder half is movable independently, as depicted by the dotted line for the rudder half 22a or together with the other rudder half depending upon the desired movement to be given the aircraft. The flexible wing type of construction used for the tails and wings may also be used for the fin 23, FIG. 3, and the rudder should it be desired. The rudder halves are connected in a customary fashion by cables or suitable linkages (not shown) to a rudder bar 72 which is in a position to be operated by the pilot's feet and legs. The bar is split into two parts and pivoted about a pivot pin 74. Each part of the bar is constrained by springs, (not shown) to align the bar at the position shown. However, by the pilot using his legs he can change the position of either half of the bar independently of the other half to cause a corresponding change in the position of the rudder halves 22a and 22b.

The split rudder may be used as an air brake simply by causing the two halves of the rudder 22a and 22b to be deflected outwardly through equal angles in opposite directions. The rudder can also be used in a more traditional fashion to give the airplane yaw control by deflecting the rudder halves 22a, 22b through approximately equal angles in the same direction. Or, the rudder can be used to provide yaw control as well as be used as an air brake by pivoting each rudder through a different angle than the other. Control of the aircraft about a vertical axis can also be obtained simply by deflecting one of the rudder parts while the other one remains in a position shown in FIG. 2. Thus if the rudder part 22a is deflected to the position shown in dotted line there will be a tendency for the aircraft to rotate the nose in a direction to port. It is to be understood that the fin and rudder shapes shown in FIG. 3 do not limit the invention as they are designed partly from an aesthetic standpoint. Also, vertical stabilizing fins may be added, such as at the extended ends of the wings, if desired.

Referring now to FIG. 5, there is illustrated in more detail the construction of the wing illustrating its simple yet novel construction. As can be seen more clearly the spar 52 which forms the leading edge of the wing is streamlined and hollow and is positioned in a drooped fashion. (A different cross sectioned spar, e.g. circular, could be used but without the advantages mentioned hereinbelow). The single sheet 56 of flexible material may be glued or attached by other suitable means such as adhesive tape to the spar or may be wrapped from a position designated by the numeral 76 around the spar and then rearwardly to the cable 54 which defines the trailing edge of the wing. It can be seen that the wing when in flight forms the traditional airfoil profile. The spar may be of any suitable material such as wood or may be as shown with a hollow interior in which case the spar may be formed of sheet metal for example. Of course, as with a sail, battens may be used to stiffen the wing if desired. It is to be noted that the wing of FIG. 5 differs structurally from those structures used in the prior art, for example, by Platz in the 1920's, at Princeton University in the 1960's, by Herreshoff in 1927, and by Gerhardt in 1937. While the Platz wing also included a flexible material the leading edge spar appeared to have a circular cross section and the flexible material was loosely wrapped around the spar and attached to itself. The Princeton wing which came in two variations included a forward spar which was either circular (or elliptical) in cross section or semi-circular (or semi-elliptical) and included two sheets of flexible material spaced one from the other forming a lifting surface. Herreshoff also included a semi-circular or bullet-shaped leading spar with a first sheet of flexible material connected to an upper portion of the spar and a second sheet connected to a lower portion of the spar. The second sheet extended to a point about half way along the chord of the first sheet to which it was then attached. Finally the Gerhardt sail included a circular cross section spar to which upper and lower flexible sheets were attached to form a lifting surface. The flexible material only was loosely placed around the spar. The advantages of the airfoil of FIG. 5 over the prior art include higher maximum lift coefficient due to the drooped nose, lower drag coefficient due to the streamline shape of the nose, and lighter weight due to the use of only a single surface of flexible material. These advantages are accompanied by increased resistance to billowing and luffing since the previously described triangular airplane structure permits high tension of the trailing edge cables 54, 54a, 46 and 46a.

Another major advantage of the present invention is its ease of operation both in the air and on the ground by the use of a very simple control system which allows one with very little or even no training to suitably operate the aircraft. Referring now to FIG. 1, one embodiment of a control system is illustrated. Connecting the trailing edge cable 46a of the starboard tail with the trailing edge cable 54a of the starboard wing is a control cable 84. It is noted that the control cable is attached to the fuselage by a hoop 86, FIGS. 1 and 2 so that it can easily be gripped by an operator seated in the seat 24. In a like fashion, a control cable 88 attaches the trailing edge cable 46 of the port tail with the trailing edge cable 54 of the port wing. A hoop 87 similar to that of the loop 86, connects the cable 88 to the fuselage so that it also may be easily gripped by the operator seated in the seat 24. Turnbuckles or other suitable means may be provided to adjust the lengths of the cables 84 and 88 to the pilot's comfort. It is contemplated that when the pilot grasps each of the cables in his hands, the cables will be slightly slack. The control cables are constrained by the hoops to pass close to the fuselage near the pilot so that should he accidentally drop them they can easily be regained.

An alternative control system is illustrated in FIG. 6. A continuous control cable 90 is connected to the trailing edge cable 54 of the port wing and mounted around pulleys 92, 94, 95 and 96 which are all attached to the fuselage. An analogous control cable 98 is attached to the trailing edge cable 54a of the starboard wing and four pulleys (not shown). It is to be understood that the hoops of the FIG. 1 control system and the pulleys of the FIG. 6 control system are merely low friction devices for allowing a change of direction of the cable and that other devices may be used, such as tubular guides or pegs to achieve the same results. For the intended purposes of the aircraft, either control system can be used even though the latter mentioned control system attaches only to the wings. The method by which the pilot manipulates the cables for flight control will be explained hereinafter.

Ground control of the aircraft is enhanced by forming the trailing edge cable of a corresponding wing and tail of a single continuous length. For example reference is made to FIG. 6 where the starboard wing and tail trailing edge cables 54a and 46a respectively are formed of a single continuous length. The trailing edges of the wing and the tail form the end portions of the continuous cable while a middle portion 100 runs along the fuselage and through an opening 102 at the rear end or aft portion of the fuselage and an opening 104 in the forward portion or fore of the fuselage. In an identical fashion the trailing edge cables of the port wing and tail may be made from a continuous length which will not be described in detail nor shown in order to enhance clarity of the starboard cable. A restraining hook 106 is attached to the fuselage and engages the central portion 100 of the starboard edge cable to insure a proper degree of tautness. To slacken the edge cable it is only necessary to disengage the central portion 100 from the hook 106. The need for taut trailing edge cables is to prevent the flexible material, which acts as a lifting surface, from billowing excessively. Such billowing would cause a loss of lift and an increase in induced drag.

In operation when the aircraft is in its unfolded position as shown in the right half of FIG. 7, the aircraft is made ready for flight by restraining the trailing edge cables of the wings and tails such as by engaging the central portion 100 with the hook 106. An oppositely placed cable for the port side of the aircraft is similarly set up. By allowing the trailing edge cables to remain slack until flight time there is little likelihood that the aircraft will lift off the ground even in a strong wind because the flexible wings will simply flutter rather than lift the aircraft. The aircraft is also easier to maneuver on the ground prior to take off. However, once the cables are made taut, the lifting surfaces of the aircraft will become more rigid and will assume the traditional airfoil profile when there is a sufficient relative velocity between the air and the airfoil.

To control the aircraft in the air, the pilot, prior to flight takes the control cables, such as the cables 84, 88 of FIG. 1 in his hands, or in the alternative system the control cables 90 and 98 in FIG. 6. The aircraft is then provided with a forward motion such as by catapulting, by being towed or by being allowed to proceed along a downhill directed rail. Of course if the aircraft is powered then it can take off in the customary manner. Once airborne the aircraft can be maneuvered simply by the movement of the pilot's hands. For example, if it is desired to roll the aircraft to the left the pilot would simply move his hands to the left. This will cause, in the FIG. 1 embodiment, the cable 84 to become taut which in turn would cause a tension upon the cables 54a and 46a. By increasing the tension in these trailing edge cables the corresponding tail and wing will become stiffer thereby increasing their lift to provide the desired rolling motion. Thus more lift will exist on the starboard side of the aircraft than on the port side. The port wing and tail remain at the same tautness since the cable 88 was initially in a slackened condition. If it is desired to roll to the right, the pilot need only move his hands to the right to stiffen the port wing and tail. Thus cable 88 becomes taut and causes an increase in lift to the left side of the aircraft.

To cause the nose portion to pitch downwardly the pilot need merely push both his hands an equal distance forward causing a tautness in the cables 88, 84 in those portions between the the pilot's hands and the trailing edge cables 54a, 54 of the wings. This will increase the lifting force on the wings inducing the wings to rise and pivoting the nose downwardly. The lifting forces of the tails would remain the same since the portions of the cables 84, 88 between the pilot's hands and the trailing edge cables of the tails remain in a slackened condition. To pitch the nose upward the reverse action is taken by the pilot, that is the pilot pulls back on the cables 84, 88 causing the trailing edge cables 46, 46a to become more taut thereby increasing the lifting force on the tails. At the same time the cables 84, 88 between the pilot's hands and the trailing edge cables 54a, 54 of the wing remain in a slackened condition. It is of course to be understood that the cables 84, 88 can be attached to a control stick or wheel rather than being directly held by a pilot.

Referring to the FIG. 6 embodiment, control is achieved simply by pulling on the cables 90 and 98 in a desired fashion. For example, to roll to the right, the pilot simply moves his right hand back and his left hand forward. This will induce a tensioning of the cable 90 from a position below the port wing 14 so that the lifting capacity of the wing is increased. At the same time the cable 98 is made taut above the starboard wing portion 16 thereby reducing its lifting capacity. To cause the aircraft to roll to port the pilot simply reverses the movement of his hands causing a tautness in a downward direction on the wing 16 thereby increasing its lifting capacity while at the same time the pilot increases the tautness in cable 90 above the wing portion 14 so as to decrease its lifting capacity. The resulting moment causes the aircraft to roll to the left. To pitch the nose downward the pilot merely pushes forward with both hands. This tautens the cables 90 and 98 below the wings thereby increasing the lift on the wings causing the wings to move upwardly and the nose downwardly. To pitch the nose upward the pilot pulls back on the cables 90 and 98 which in turn causes a tension above each of the wings causing the wings to lose some of their lift thereby rotating the wings downwardly and the nose upwardly. One advantage of the FIG. 6 embodiment control system is that the cables are relatively high off the ground aand unlike the FIG. 1 control system, they are less likely to be snagged by ground cover upon landing or taking off. As in the FIG. 1 embodiment, the cables of the FIG. 6 embodiment may also be attached to a wheel or stick rather than being held directly by the pilot. An additional advantage of the FIG. 6 embodiment is that the control cables can operate the trailing edges of the wings downwardly or upwardly rather than just downwardly as in the FIG. 1 embodiment. A larger rolling moment is created thereby.

Upon landing, the trailing edge cables are slackened by sliding them off the hook 106 and the corresponding hook on the opposite side of the fuselage, to minimize the chance of a strong gust of wind lifting the airplane partially or completely off the ground undesirably.

Another major advantage of the present aircraft is its good stability. This is accomplished by the droop of the tail spars 44, 44a, FIG. 2. The spars 44, 44a are drooped similarly to the spar 52 illustrated in FIG. 5. The taper of the tails when viewed in plan, combined with this droop causes the tail airfoil to have a pronounced washout at the tips. This improves longitudinal stability of the aircraft. The washout may be set to any desired value by suitably designing the tail spars to have appropriate taper or twist. Another advantage of the attachment of the tails to the wings is that the outboard portions of the tail form a slat for the corresponding portions of the wing thereby increasing the maximum lift coefficient of the wing and reducing the likelihood of the commencement of a stall at the extended ends of the wings. Stalling at the extended wing portions is more undesirable than a stall commencing at the center portions of the wing because a rolling motion is induced by a stall at the wing ends.

As mentioned, the fuselage is preferably covered with any suitable material for aesthetic purposes; the aircraft will, of course, function even if the tubular frame shown in FIG. 4 is left uncovered. If in fact the aircraft is covered it is desirable for the covering to terminate at the skid member 36 without wrapping around the member since the member 36 may act as a skid upon landing. This will tend to tear away any type of covering which might be present. By allowing the member 36 to act as the skid the simplicity of the construction is enhanced as well as insuring a light weight structure.

To enhance the safety of the aircraft and protection of the pilot reference is made to FIGS. 2 and 3. Top skids 110 and 112 are attached at the end portions of the tail just forward of the fasteners 70, 70a which attach the wings and the tails. The tip skids 110 and 112 are preferably made of spring steel to absorb the shock of landings. The tip skids not only enhance stability during landing to limit the degree of rolling, but also function should the aircraft come into contact with an object such as a tree. For example, should the spar 44 contact a tree with sufficient force, the port tail 18 would break away from attachment with the wing 14. Because of the placement of the tip skid 110 however, the triangular construction formed by the spars 44, 52 and the fuselage 12 would remain because the impact force would cause the tail to fold inwardly toward the fuselage 12. However, the tip skid 110 will slide along the spar 52 tending to keep the aircraft in its original rigid configuration. The tip skid will also act to retard by friction the movement of the tail toward the fuselage. The elasticity of the tip skid and the friction between it and the spar 52 of the wing will absorb much of the energy of the collision. The triangular structure will not collapse until either the tio skid breaks or is deformed to such an extent that it slides off the wing spar or the tail or wing spars break. The tip skid may also be attached to the wing spar though in the event of a crash the advantages just mentioned would be lost. It is noted that the rigidity of the aircraft is particularly high in the plane formed by the spars 44, 44a, 52 and 52a. It is within this plane that the aircraft will experience the greatest "g" loads induced by a sudden deceleration. It is noted that in a crash situation these "g" loads will be much higher than any loads acting on the glider during normal or even aerobatic flight. It is thus clear that the aircraft is most rigid in the direction of the greatest potential loads.

As already mentioned another advantage of the triangular structure is that it assists the tail and wing spars in resisting the deformation induced by the tensioning of the trailing edge cables. By connecting the spars the load on each individual spar due to the tensioning of the cables is reduced. This enables the cross sectional area and the total weight of the spars to be smaller than would be the case if they were not joined. Of course, this enhances the low cost and the low weight of the aircraft.

A safety belt and harness is also to be provided though it is not shown. And, of course, the seat 24 may be sufficiently wide to seat two people if so desired.

As mentioned earlier, another major advantage of the present invention is its ability to be folded and thereby easily transported and stored. Referring now to FIG. 7, half of the aircraft 10 is in a folded position and the other half of the aircraft is in an unfolded condition. As mentioned hereinabove, the port tail 18 is pivotally connected by the hinge 50 to the fuselage 12 while the port wing 14 is pivotally connected to the fuselage by the hinge 58. Folding the aircraft is a very simple matter. First, the fastener 70, FIG. 2, which attaches the tail and the wing is disengaged. Next, the tip brace is disengaged from the tip rib 60 allowing the tip rib to be pivoted about the hinge 62 to a position almost parallel with the spar 52. The tip brace 64 itself is pivoted about the hinge 68 and is fastened in a suitable manner to the spar 52 in a position substantially parallel thereto. Next the wing is rotated in the forward direction to a position parallel to that of the fuselage as shown in its folded condition on the left side of FIG. 7. Finally, the tail portion is pivoted in an aftward direction toward the fuselage to a position almost parallel to the fuselage as shown. In a similar manner, the starboard tail and wing may be folded to a position corresponding to the left side of the aircraft. Preferably fasteners or other means are provided to retain the aircraft in a folded position. For example the fasteners 70, 70a may be snaps which are arranged to attach a corresponding wing and tail to the fuselage or to the opposite folded wing or tail.

The flexible material of the tail and wing may be of any suitable material such as dacron or mylar. Rigidity of the tail is provided by the leading edge spar and the tension in the trailing edge cable. Rigidity of the wing is provided by the leading edge spar, the wing tip rib, the wing tip brace and the tension trailing edge cable. Further rigidity is provided by the triangular joining of the wing and the tail with a central brace formed by the fuselage.

The nose portion of the fuselage including member 34, FIG. 4 is shaped in a curve similar to an upper surface of an airfoil. The flexible material of the tail should be attached to the member 34 between the locations designated 114 and 116, FIG. 4.

Referring now to FIG. 8, a powered embodiment of the aircraft is illustrated. To accommodate a motor 120 and mounting 122 the nose portion of the aircraft is extended slightly. Additional items such as engine controls, instruments and wheels usual with a powered aircraft are to be included, though not shown here.

Referring to FIG. 1 again, a tow cable 150 is attached to the aircraft 10 and to a device 152 shown in block form which can selectively increase drag when some predetermined flight characteristic is exceeded. As more fully explained in my copending application titled Apparatus For Distance Control Ser. No. 515,886 filed Oct. 18, 1974, the device in a first mode provides little resistance to the aircraft, however, should the aircraft exceed a predetermined altitude the device in a second mode exerts a large drag on the aircraft so as to increase the steepness of the aircraft's glide path. The device may be used to actuate certain controls such as airbrakes when the predetermined threshold has been exceeded. Using the device in conjunction with the airbrakes the aircraft can be used as an amusement type apparatus with a high degree of safety.

It is recommended that a preferred embodiment of a glider aircraft have a wing span of about 31 feet, a length of about 22 feet and a total lifting area of about 200 square feet (lifting area of tails and wings). A glide angle range deemed most appropriate would be between 1 in 4 to 1 in 9. It is to be understood that the glide angle can be altered (by setting the airbrakes for example) to more nearly fit the particular terrain to be traversed. For a powered aircraft a slight increase in the length of the nose, (see FIG. 8.) is recommended upon which is mounted a motor having a brake horsepower between 60 and 100.

I claim:

1. A foldable aircraft comprising:
   a fuselage having fore and aft portions;
   a first airfoil connected to said fuselage and extending outwardly therefrom, said airfoil having a spar;
   a second airfoil having a spar connected to said fuselage at a location spaced forwardly from the connection of said first airfoil, said spar of said second airfoil having extended ends connected to said spar of said first airfoil;
   said spar of said first airfoil being connected to said fuselage at the aft portion and having a starboard part and a port part;
   a first hinge connecting said starboard part of said spar to said fuselage;
   a second hinge connecting said port part of said spar to said fuselage; and
   said spar of said second airfoil being connected to said fuselage at the fore portion and having a starboard part and a port part;
   a third hinge connecting said starboard part of said second airfoil spar to said fuselage; and
   a fourth hinge connecting said port part of said second airfoil spar to said fuselage.

2. An aircraft comprising:
   a fuselage;

an airfoil connected to said fuselage and extending outwardly therefrom, said airfoil having a leading edge spar;

a second outwardly extending spar connected to said fuselage at a location spaced forwardly from the connection of said first mentioned spar, said second spar having extended ends connected to said first mentioned spar;

first and second skids each attached to a corresponding extended end of said second spar, each of said skids positioned to slide along said first-mentioned spar toward said fuselage when an impact is received by said second spar.

3. An aircraft comprising:
a fuselage;
an airfoil connected to said fuselage and extending outwardly therefrom, said airfoil having a leading edge spar and a trailing edge;
a second outwardly extending spar connected to said fuselage at a location spaced forwardly from the connection of said first mentioned spar, said second spar having extended ends connected to said first mentioned spar;
a control cable connected to said trailing edge of said airfoil and extending to said fuselage adjacent a position on said fuselage for an operator of said aircraft, said cable being attached to an upstanding fin so as to position said cable above and below said trailing edge of said airfoil to move said trailing edge upwardly and downwardly.

4. An aircraft comprising:
a fuselage;
aa first airfoil connected to said fuselage and extending outwardly therefrom, said first airfoil having a leading edge spar, a trailing edge, and port and starboard portions;
a second airfoil having a leading edge spar, a trailing edge, and port and starboard portions, said second airfoil being connected to said fuselage at a location spaced forwardly from the connection of said first airfoil, said spar of said second airfoil having extended ends connected to said spar of said first airfoil;
a first control cable having two ends, one end connected to the trailing edge of the first airfoil port portion and the other end connected to the trailing edge of the second airfoil port portion; and
a second cable having two ends, one end connected to the trailing edge of the first airfoil starboard portion and the other end connected to the trailing edge of the second airfoil starboard portion.

5. An aircraft comprising:
a fuselage;
a first airfoil connected to said fuselage and extending outwardly therefrom, said airfoil having a leading edge spar;
a second airfoil having a leading edge spar connected to said fuselage at a location spaced forwardly from the connection of said first airfoil, said spar of said second airfoil having extended ends connected to said spar of said first airfoil;
a split rudder connected to said fuselage and positioned immediately aft of the first airfoil and in the airstream of said first airfoil for increasing the induced drag of said first airfoil.

6. An aircraft comprising:
a fuselage;
a first flexible airfoil connected to said fuselage and extending away therefrom to form port and starboard portions, said first airfoil having leading and trailing edges;
a second flexible airfoil connected to said fuselage and extending away therefrom to form port and starboard portions, said second airfoil having leading and trailing edges;
a first control cable having two ends, one end connected to the port portion of said first airfoil and the other end connected to the port portion of said second airfoil;
a second control cable having two ends, one end connected to the starboard portion of said first airfoil and the other end connected to the starboard portion of said second airfoil.

7. An aircraft as claimed in claim 6 including cable restraining means attached to said fuselage for guiding said control cables.

8. An aircraft as claimed in claim 7 including a first trailing edge cable extending continuously along trailing edges of said port portions of said airfoils; and
a second trailing edge cable extending continuously along trailing edges of said starboard portions of said airfoils.

9. An aircraft as claimed in claim 8 wherein said cable restraining means retains said trailing edge cables in a relatively taut position, said trailing edge cables being movable between two positions, a first position wherein said trailing edge cables engage said cable restraining means to cause said trailing edge cables to be relatively taut and a second position wherein said trailing edge cables are free from engagement with said cable restraining means to cause said trailing edge cables to be relatively slack.

10. An aircraft comprising:
a fuselage;
a first flexible airfoil connected to said fuselage and extending away therefrom to form port and starboard portions, said first airfoil having leading and trailing edges;
a second flexible airfoil connected to said fuselage and extending away therefrom to form port and starboard portions, said second airfoil having leading and trailing edges;
a first continuous cable positioned along the trailing edge of said port portion of said first airfoil and extending to said port portion of said second airfoil and positioned along the trailing edge of said port portion of said second airfoil; and
a second continuous cable positioned along the trailing edge of said starboard portion of said first airfoil and extending to said starboard portion of said second airfoil and positioned along the trailing edge of said starboard portion of said second airfoil;
whereby loosening said first and second continuous cables substantially lessens the lifting capability of said flexible airfoils.

11. An aircraft as claimed in claim 10 including cable restraining means attached to said fuselage for restraining said trailing edge cables relative to said fuselage.

12. An aircraft comprising:
a fuselage having fore and aft portions;
a first airfoil connected to said aft portion of said fuselage, and said airfoil extending outwardly therefrom;

a second airfoil connected to said fuselage at a location spaced forwardly from said first airfoil and at an elevation different from said first airfoil, said second airfoil extending rearwardly away from said fuselage and having extended ends connected to said first airfoil, said first and second airfoils forming a triangular configuration in front elevation view wherein said first airfoil resists lifting loads developed on said second airfoil, said aft portion of said fuselage including a vertically extending member for providing directional stability and to which is mounted said first airfoil.

13. An aircraft as claimed in claim 12 wherein the aft portion of said fuselage extends vertically upwardly for providing directional stability, and said first airfoil is mounted on said aft portion at an elevation vertically above the connection location of said second airfoil.

14. An aircraft as claimed in claim 12 wherein said vertically extending member is a fin; a rudder is attached to said fin; and said first airfoil is mounted on said fin immediately adjacent to said rudder.

15. An aircraft as claimed in claim 12 wherein said airfoils and said fuselage form a generally triangular configuration in side elevation.

16. An aircraft as claimed in claim 12 wherein said airfoils and said fuselage form two generally triangular configurations in front elevation view.

17. An aircraft comprising:
a fuselage having fore and aft portions;
said fuselage having a vertically extending fin;
a first airfoil connected to said fin;
a second airfoil connected to said fore portion of said fuselage;
said second airfoil extending outwardly and upwardly toward said first airfoil; and
said first airfoil and said second airfoil being connected so as to form with said fuselage two generally triangular configurations in plan view and two generally triangular configurations in front elevation view.

18. An aircraft as claimed in claim 17 wherein said airfoils and said fuselage form a generally triangular configuration in side elevation view.

19. An aircraft as claimed in claim 17 wherein said airfoils form a generally triangular configuration in plan view.

20. An aircraft as claimed in claim 17 wherein bracing for said second airfoil consists solely of said first airfoil.

21. An aircraft as claimed in claim 17 wherein bracing between said first and second airfoils consists solely of lift generating elements.

* * * * *